United States Patent
Northcutt et al.

(10) Patent No.: US 7,346,689 B1
(45) Date of Patent: Mar. 18, 2008

(54) COMPUTER ARCHITECTURE HAVING A STATELESS HUMAN INTERFACE DEVICE AND METHODS OF USE

(75) Inventors: J. Duane Northcutt, Manlo Park, CA (US); James G. Hanko, Redwood City, CA (US); Alan T. Ruberg, Foster City, CA (US); Gerard A Wall, San Jose, CA (US); Lawrence L. Butcher, Mountain View, CA (US); Neil C. Wilhelm, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/063,335

(22) Filed: Apr. 20, 1998

(51) Int. Cl.
*G06F 13/00* (2006.01)

(52) U.S. Cl. .................... 709/227; 709/219; 709/225; 719/328

(58) Field of Classification Search .............. 709/1, 709/200, 201, 202, 203, 208, 217, 218, 219, 709/250, 300, 301, 302, 223, 225, 227, 228; 707/10, 104

See application file for complete search history.

(56) References Cited

U.S. PATENT DOCUMENTS

| | | | | |
|---|---|---|---|---|
| 5,602,905 | A | * | 2/1997 | Mettke ................. 379/93.22 |
| 5,623,656 | A | * | 4/1997 | Lyons ...................... 707/10 |
| 5,654,886 | A | * | 8/1997 | Zereski, Jr. et al. ............ 702/3 |
| 5,761,662 | A | * | 6/1998 | Dasan ...................... 707/10 |
| 5,784,562 | A | * | 7/1998 | Diener .................... 709/217 |
| 5,790,792 | A | | 8/1998 | Dudgeon et al. |

(Continued)

FOREIGN PATENT DOCUMENTS

| | | |
|---|---|---|
| WO | 9806207 | 2/1998 |
| WO | WO98/06207 | 2/1998 |
| WO | WO 99/26159 | 5/1999 |

OTHER PUBLICATIONS

Oracle, "The Network Computer-Intelligent Clients for the Age of Network Computing," Database and Network Journal, vol. 26, No. 3.

(Continued)

*Primary Examiner*—Viet D. Vu
(74) *Attorney, Agent, or Firm*—Martine Penilla & Gencarella, LLP

(57) ABSTRACT

The invention provides a central office metaphor to computing, where features and functions are provided by a one or more servers and communicated to an appliance terminal through a network. Data providers are defined as "services" and are provided by one or more processing resources. The services communicate to display terminals through a network, such as Ethernet. The terminals are configured to display data, and to send keyboard, cursor, audio, and video data through the network to the processing server. Functionality is partitioned so that databases, server and graphical user interface functions are provided by the services, and human interface functionality is provided by the terminal. Communication with the terminals from various services is accomplished by converting disparate output to a common protocol. Appropriate drivers are provided for each service to allow protocol conversion. Multiple terminals are coupled to the network. Users can enable their unique session at any one of the terminals by inserting a "smart card" into a card reader. Removing the card disables the session. Re-inserting the card into the same or any other terminal re-enables the session.

13 Claims, 5 Drawing Sheets

U.S. PATENT DOCUMENTS

| | | | | | |
|---|---|---|---|---|---|
| 5,793,365 | A | * | 8/1998 | Tang et al. | 715/758 |
| 5,805,804 | A | * | 9/1998 | Laursen et al. | 348/7 |
| 5,812,765 | A | * | 9/1998 | Curtis | 709/200 |
| 5,864,868 | A | * | 1/1999 | Contois | 707/104 |
| 5,864,870 | A | * | 1/1999 | Guck | 707/104 |
| 5,881,239 | A | * | 3/1999 | Desgrousilliers | 709/226 |
| 5,918,013 | A | * | 6/1999 | Mighdoll et al. | 709/229 |
| 5,928,363 | A | * | 7/1999 | Ruvolo | 726/22 |
| 5,935,212 | A | * | 8/1999 | Kalajan et al. | 709/228 |
| 5,960,085 | A | * | 9/1999 | de la Huerga | 340/5.61 |
| 5,961,601 | A | * | 10/1999 | Iyengar | 709/229 |
| 5,983,273 | A | * | 11/1999 | White et al. | 709/229 |
| 6,006,266 | A | * | 12/1999 | Murphy et al. | 709/227 |
| 6,035,404 | A | * | 3/2000 | Zhao | 713/201 |
| 6,041,357 | A | * | 3/2000 | Kunzelman et al. | 709/228 |
| 6,076,108 | A | * | 6/2000 | Courts et al. | 709/227 |
| 6,193,153 | B1 | * | 2/2001 | Lambert | 235/380 |
| 6,336,135 | B1 | * | 1/2002 | Niblett et al. | 709/215 |
| 6,449,344 | B1 | * | 9/2002 | Goldfinger et al. | 379/88.17 |
| 6,938,257 | B1 | * | 8/2005 | Rapp et al. | 719/311 |

OTHER PUBLICATIONS

Angel E. Socarras, Robert S. Cooper, William F. Stonecypher, NCR Corp., "Anatomy of an X Terminal," IEEE Spectrum, Mar. 1991, No. 3, pp. 52-55.

Peter Wayner, "Inside the NC," Byte, Nov. 1996, pp. 105-110.

Samuel Sheng, Anantha Chandrakasan, and R.W. Brodersen,"A Portable Multimedia Terminal," IEEE Communications Magazine, Dec. 1992, No. 12, pp. 64-75.

Rob Pike, "8½, the Plan 9 Window System," pp. 1-9, AT&T Bell Laboratories, Murry Hill, New Jersey 07974.

Ian Alexander Pratt, "The User-Safe Device I/O Architecture," pp. i-180, Aug. 1997, King's College, University of Cambridge.

Mark Hayter and Derek McAuley, "To Appear in ACM Operating Systems Review," pp. 1-10, May 1991, University of Cambridge Computer Laboratory.

P. Barham, M. Hayter, D. McAuley and I. Pratt, "Devices on the Desk Area Network," pp. 10-1 through 10-17, Mar. 1994, University of CambridgeComputer Laboratory.

Tristan Richardson, Quentin Stafford-Fraser, Kenneth R. Wood, and Andy Hopper, "Virtual Network Computing," pp. 33-37, Jan.-Feb. 1998, the Olivetti & Oracle Research Laboratory.

"The Network Computer—Intelligent Clients For the Age of Network Computing," Database and Network Journal, vol. 26 No. 3, pp. 3-5.

Angel E. Socarras, Robert S. Cooper, William F. Stonecypher, "Anatomy of An X Terminal," IEEE Spectrum, Mar. 1991, pp. 52-55.

Peter Wayner, "Inside the NC," Byte, Nov. 1996 pp. 105-110.

Robert W. Brodersen, Anantha P. Chan-Drakasan, and Samuel Sheng, "A Portable Multimedia Terminal," IEEE Communications Magazine, Nno.12, Dec. 1992, pp. 64-75.

Rob Pike, "8½, the Plan 9 Window System," pp. 1-9, AT&T Bell Laboratories, Murry Hill, New Jersey 07974, 1991.

Ian Alexander Pratt, "The User-Safe Device I/O Architecture," pp. i-180, Aug. 1997, King's College, University of Cambridge.

Mark Hayter and Derek McAuley, "To Appear in ACM Operating Systems Review," pp. 1-10, May 1991, University of Cambridge Computer Laboratory.

P. Barham, M. Hayter, D. McAuley and I. Pratt, "Devices on the Desk Area Network," pp. 10-1 through 10-17, Mar. 1994, University of CambridgeComputer Laboratory.

Tristan Richardson, Quentin Stafford-Fraser, Kenneth R. Wood, and Andy Hopper, "Virtual Network Computing," pp. 33-37, Jan.-Feb. 1998, the Olivetti & Oracle Research Laboratory.

Dasgupta et al., "*A Movable User Interface Based on a Simple E-Window Like Protocol*", pp. 199-203, 1999, Gas Authority of India Ltd., New Delhi, India.

Rob Pike, "8½, the Plan 9 Window System," pp. 1-9, AT&T Bell Laboratories, Murry Hill, New Jersey 07974, undated.

Ian Alexander Pratt, "The User-Safe Device I/O Architecture," pp. i-180, Aug. 1997, King's College, University of Cambridge.

Mark Hayter and Derek McAuley, "To Appear in ACM Operating Systems Review," pp. 1-10, May 1991, University of Cambridge Computer Laboratory.

P. Barham, M. Hayter, D. McAuley and I. Pratt, "Devices on the Desk Area Network," pp. 10-1 through 10-17, Mar. 1994, University of CambridgeComputer Laboratory.

Tristan Richardson, Quentin Stafford-Fraser, Kenneth R. Wood, and Andy Hopper, "Virtual Network Computing," pp. 33-37, Jan.-Feb. 1998, the Olivetti & Oracle Research Laboratory.

Oracle, "The Network Computer-Intelligent Clients for the Age of Network Computing," Database and Network Journal, vol. 26, No. 3, undated.

Angel E. Socarras, Robert S. Cooper, William F. Stonecypher, NCR Corp., "Anatomy of an X Terminal," IEEE Spectrum, Mar. 1991, No. 3, pp. 52-55.

Peter Wayner, "Inside the NC," Byte, Nov. 1996, pp. 105-110.

Samuel Sheng, Anantha Chandrakasan, and R.W. Brodersen, "A Portable Multimedia Terminal," IEEE Communications Magazine, Dec. 1992, No. 12, pp. 64-75.

* cited by examiner

COMPUTER ARCHITECTURE HAVING A STATELESS HUMAN INTERFACE DEVICE AND METHODS OF USE

BACKGROUND OF THE INVENTION

1. Field of the Invention

This invention relates to the field of computer systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

Computer users desire high performance computing experiences at increasingly lower cost. Current attempts to satisfy this demand have resulted in computing systems of marginally lower cost but significantly reduced performance. Computer users are being offered the choice of paying a little less money to get a lot less computer. The problem to be solved is how to give higher or equal performance computing experiences at significantly lower cost. This problem can be better understood by reviewing the evolution of computing systems.

The paradigms by which computer systems have been configured have changed over time. In earlier times, a computer was a room sized device that was accessed by a user in the immediate vicinity of the computer. Such computers were known as "mainframe" computers. Eventually, it was desired to have larger numbers of users access the computing power of the mainframe. This led to the use of a plurality of so called "dumb terminals" communicating with the mainframe through a network. The mainframe was the central station that provided computational power and data storage. The dumb terminal was a display device for data provided by the mainframe, and also provided a means to communicate some data to the mainframe. The terminals were referred to as dumb terminals because they did not possess local processing or data storage functionality. The terminal, if unplugged from the mainframe network, could not provide any computing experience. A disadvantage of the mainframe/terminal architecture was the high cost associated with the mainframe computer itself. Only large concerns with large numbers of users could justify the purchase and use of a mainframe/terminal system.

The introduction of the personal computer, also known as the desktop computer, provided a solution to the disadvantages of mainframe systems. A desktop computer is a self contained computing system where all applications, data, and computing power are resident on the desktop computer system itself. Such personal computers and have spurred the use of computers in homes and offices. The cost of a desktop system was relatively low compared to a mainframe environment. A single user could afford to purchase a desktop system. However, several disadvantages soon became apparent in the use of desktop computers. One disadvantage was the isolation of the desktop computer. No longer being part of a centralized and consistent network, users found it difficult to share data with other users. Because each desktop computer had its own software, there were problems with incompatible versions of software applications on different computers. Further, with multiple operating systems, some data could not be shared at all, or only after it had been specially converted to some compatible form.

Some solutions to these problems were provided with the rise of client/server systems. Desktop computers became linked together in company networks. Common data and in some cases, applications, were stored on a central computing system called a server. The server maintained common data and provided copies of it to clients (desktop computers) when requested. Client server systems also had disadvantages. One was hardware obsolescence. Desktop computers are microprocessor driven, and as faster and more powerful microprocessors become available, upgrades of existing desktop systems, or purchase of new desktop systems, is required. In many offices, there are personal desktop computers distributed throughout, sometimes numbering in the thousands and tens of thousands. Some hardware components, such as system RAM, can be upgraded without replacing the entire desktop system. However, depending on the age and type of the desktop system, there is a limit to the upgradeability of system RAM. Even when it can be upgraded, the cost of upgrading tens of thousands of desktop computers can be staggering. Similar problems exist for local hard disk storage upgrades. When the system can no longer be upgraded, it must be replaced. The introduction of newer versions of software applications and operating systems sometimes requires the use of hardware specifications that are no longer met be existing desktop systems. This requires the replacement of tens of thousands of desktop computers, sometimes as often as every three years.

Another disadvantage of such systems is the lack of compatibility of applications and data on individual systems. Some users may have more recent versions of software applications that are not backwards compatible with older versions of the software. The solution to this problem is to maintain consistent software on all systems. However, the cost to upgrade each system and to provide licensed copies of software and software upgrades can be substantial. In addition, the installation of software and the maintenance of software requires a large administrative effort. Even with remote system administration capabilities, the tracking and cataloguing of software resources is burdensome. In addition to company mandated software, users typically add unauthorized software to their systems, including entertainment software, software optimizers, and even productivity tools that may negatively interfere with the overall network operation. Even more dangerous is the introduction of computer viruses onto a company network by the installation of an unauthorized application by a user.

Recently, the rise of the internet has resulted in the proposed use of so-called "network computers". A network computer is a stripped down version of a personal computer with less storage space, less memory, and often less computational power. The idea is that network computers will access data through the internet, and only those applications that are needed for a particular task will be provided to the network computer. When the applications are no longer being used, they are not stored on the network computer. There has been some criticism of such systems as lacking the power of a full desktop system, yet not being inexpensive enough to justify the reduced capability. And even though the network computer is a subset of a desktop computer, the network computer may still require upgrades of hardware and software to maintain adequate performance levels.

A system is needed that provides the performance and greater cost benefits than desktop systems, combined with the administrative ease of mainframe systems, with reduced obsolescence of hardware.

SUMMARY OF THE INVENTION

The invention provides a central office metaphor to computing, where features and functions are provided by one or more servers and communicated to an appliance terminal through a network. Data providers are defined as "services" and are provided by one or more processing resources. The services communicate to display terminals through a network, such as Ethernet. The terminals are configured to display data, and to send keyboard, cursor, audio, and video data through the network to the processing server. Functionality is partitioned so that databases, server and graphical user interface functions are provided by the services, and human interface functionality is provided by the terminal. Communication with the terminals from various services is accomplished by converting disparate output to a common protocol. Appropriate drivers are provided for each service to allow protocol conversion. Multiple terminals are coupled to the network. Users can enable their unique session at any one of the terminals by inserting a "smart card" into a card reader. Removing the card disables the session. Re-inserting the card into the same or any other terminal re-enables the session.

DETAILED DESCRIPTION OF THE INVENTION

The invention is a method and apparatus for providing a virtual desktop system architecture. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The present invention provides a new computer system architecture referred to as the virtual desktop architecture. This system offers substantially greater levels of functionality at a lower cost than prior art systems. The invention provides for a re-partitioning of functionality between a central server installation and the user hardware. Data and computational functionality are provided by data sources via a centralized processing arrangement. At the user end, all functionality is eliminated except that which generates output to the user (e.g. display and speakers), takes input from the user (e.g. mouse and keyboard) or other peripherals that the user may interact with (e.g. scanners, cameras, removable storage, etc.).

All computing is done by the central data source and the computation is done independently of the destination of the data being generated. The output of the data source is provided to a terminal, referred to here as a "Human Interface Device" (HID). The HID is capable of receiving the data and displaying the data.

The virtual desktop system architecture of the present invention may be analogized to other highly partitioned systems. For example, a public telephone company maintains powerful and sophisticated processing power and large databases at central offices. However, the human interface device, the telephone, is relatively simple and does not require upgrading when new features or services are added by the telephone company. The telephone itself becomes an appliance of low cost and extremely low obsolescence. Similarly, the display monitor of most computer systems has low obsolescence, and is typically retained through most desktop system upgrades.

Virtual Desktop System Architecture

Figure 3:
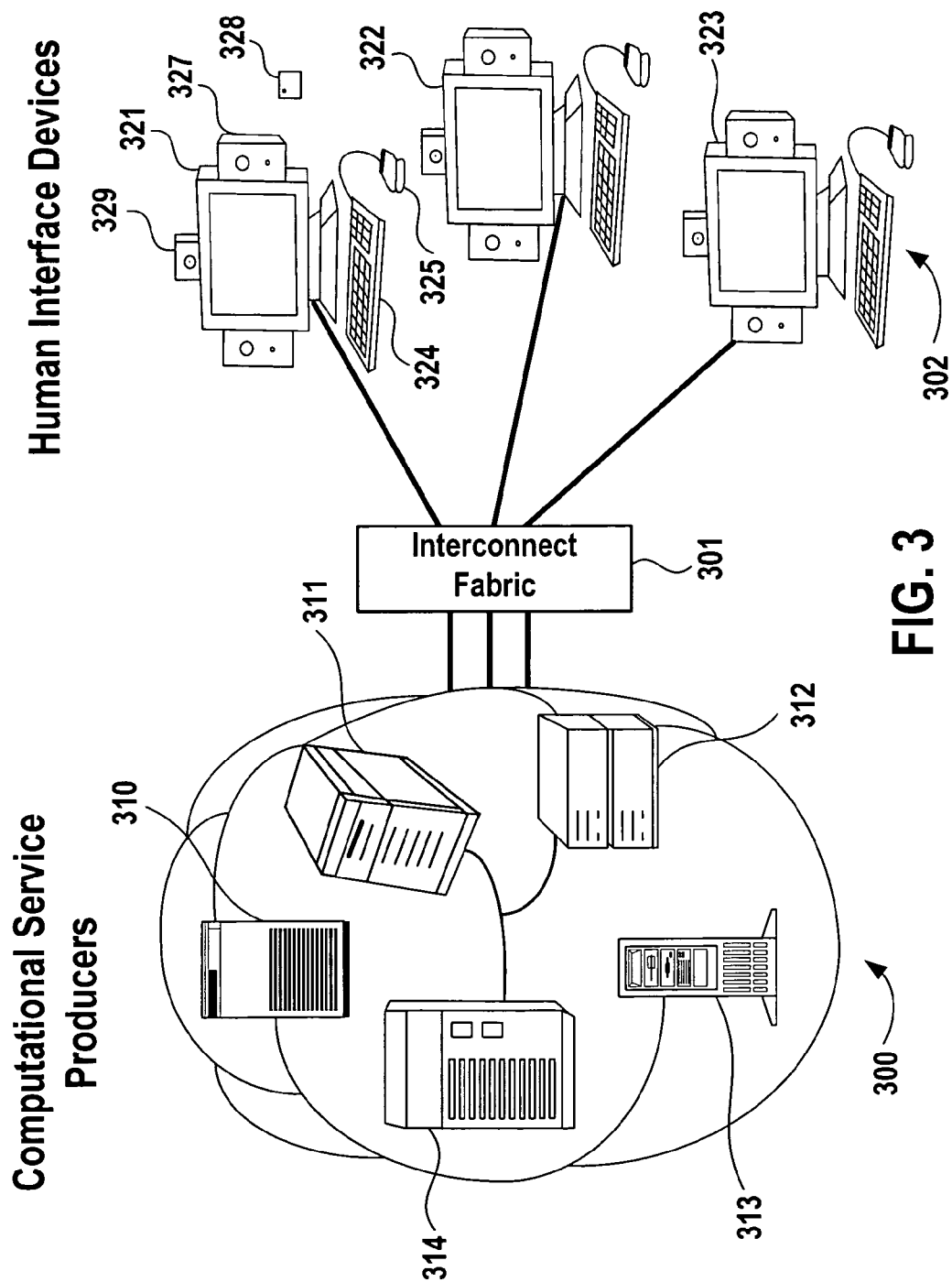
FIG. 3 illustrates the virtual desktop environment of the present invention.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 3. Referring to FIG. 3, the system consists of computational service providers 300 communicating data through interconnect fabric 301 to HIDs 302.

Computational Service Providers

In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 3, the services are found on computers 310, 311, 312, 313, and 314. It is important to note that the central data source can also be providing data that comes from outside of the central data source, such as for example, the internet or world wide web. The data source could also be broadcast entities such as those that broadcast data such as television or radio signals.

Examples of services include X11/Unix services, archived or live audio or video services, Windows NT service, Java™ program execution service, and others. A service herein is a process that provides output data and responds to user requests and input.

It is the responsibility of the service to handle communications with the HID that is currently being used to access the given service. This involves taking the output from the computational service and converting it to a standard protocol for the HID. This data protocol conversion is handled in one embodiment of the invention by a middleware layer, such as the X11 server, the Microsoft Windows interface, a video format transcoder, the OpenGL interface, or a variant of the java.awt.graphics class) within the service producer machine. The service machine handles the translation to and from the virtual desktop architecture wire protocol.

In an embodiment of the invention, each service is provided by a computing device optimized for its performance. For example, an Enterprise class machine could be used to provide X11/Unix service, a Sun MediaCenter could be used to provide video service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

Human Interface Devices

The HID is the means by which users access the computational services provided by the services. FIG. 3 illustrates HIDs 321, 322, and 323. A HID consists of a display 326, a keyboard 324, mouse 325, and audio speakers 327. The HID includes the electronics need to interface these devices to the interconnection fabric and to transmit to and receive data from the services.

Figure 4:
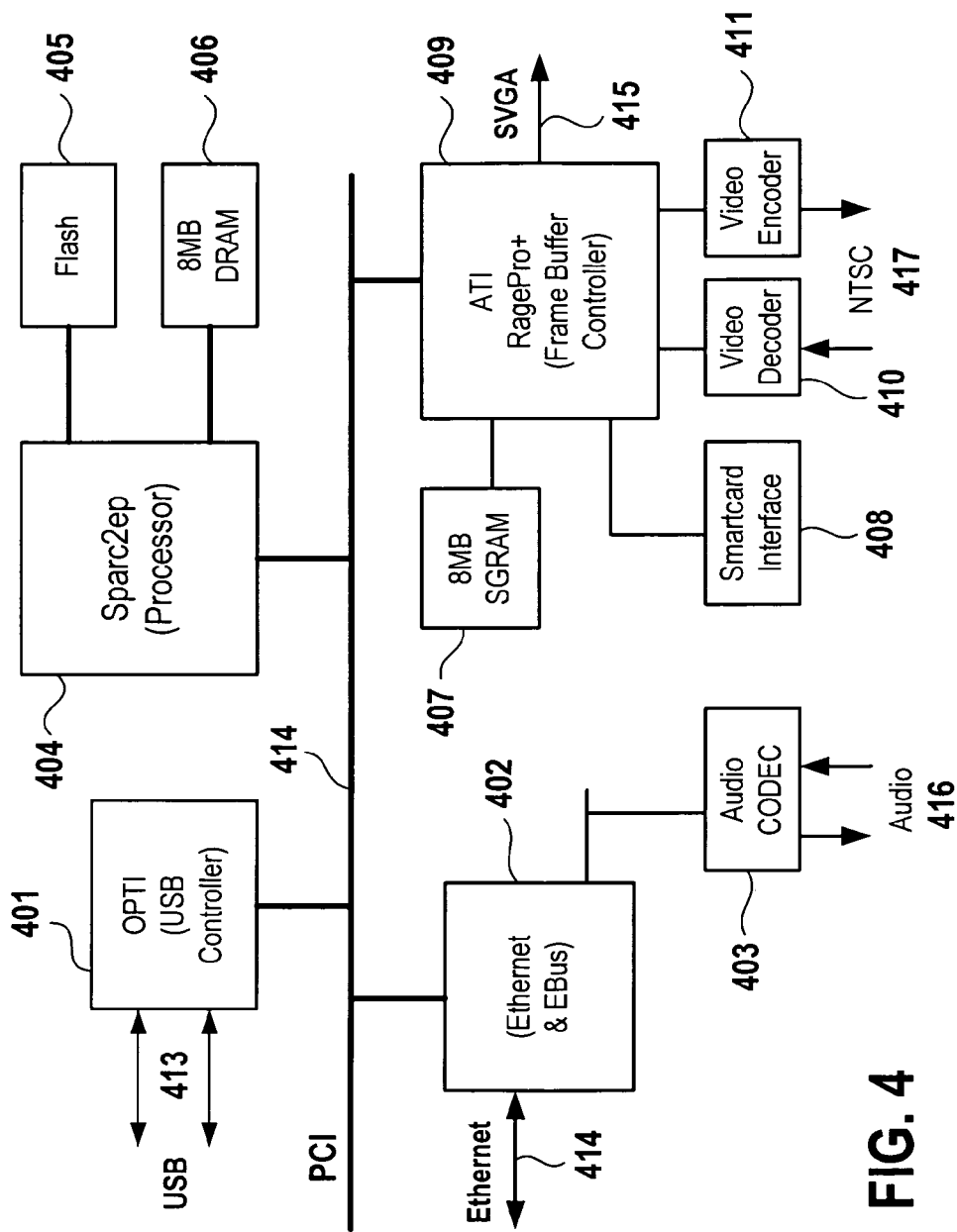
FIG. 4 is a block diagram of one embodiment of an HID of the present invention.

A block diagram of the HID is illustrated in FIG. 4. The components of the HID are coupled internally to a PCI bus 412. A network control block 402 communicates to the interconnect fabric, such as an ethernet, through line 414. An audio codec 403 receives audio data on interface 416 and is coupled to block 402. USB data communication is provided on lines 413 to USB controller 401.

An embedded processor 404 may be, for example, a Sparc2ep with coupled flash memory 405 and DRAM 406. The USB controller 401, network controller 402 and embedded processor 404 are all coupled to the PCI bus 412. Also coupled to the PCI 412 is the video controller 409. The video controller 409 may be for example, and ATI RagePro+ frame buffer controller that provides SVGA output on line 415. NTSC data is provided in and out of the video controller through video decoder 410 and video encoder 411 respectively. A smartcard interface 408 may also be coupled to the video controller 409.

Figure 5:
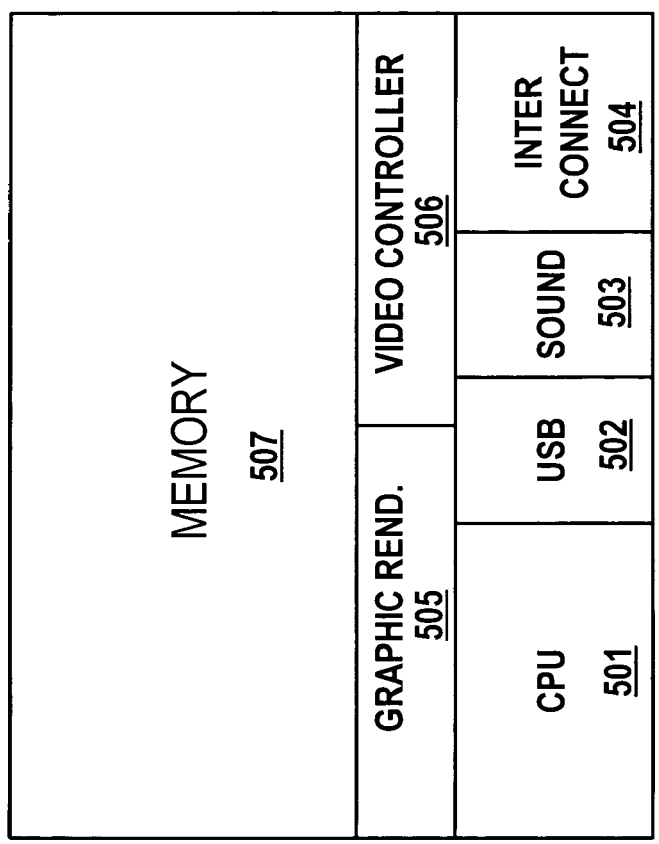
FIG. 5 illustrates a single chip HID embodiment of the present invention.

Alternatively, the HID can be implemented using a single chip solution as illustrated in FIG. 5. The single chip solution includes the necessary processing capability implemented via CPU 501 and graphics renderer 505. Chip memory 507 is provided, along with video controller/interface 506. A universal serial bus (USB) controller 502 is provided to permit communication to a mouse, keyboard and other local devices attached to the HID. A sound controller 503 and interconnect interface 504 are also provided. The video interface shares memory 507 with the CPU 501 and graphics renderer 505. The software used in this embodiment may reside locally in non volatile memory or it can be loaded through the interconnection interface when the device is powered.

Operation of the Virtual Desktop System Architecture

Session Handling

The provision of services in the virtual desktop system architecture revolves around an abstraction referred to here as a session. A session is a long-lived, persistent and reliable representation of those services which are executing on behalf of a user at any point in time. A new session is created when a new user is enabled on the system, and all of a user's sessions are destroyed when a user is removed from the system. The session abstraction is maintained by a facility known as the session manager, whose duty it is to maintain the database of mappings between users and sessions, and to manage the services which make up each session. For each user that the system is aware of there are one or more sessions. The session manager offers a service to the user that allows sessions to be configured and new sessions to be created.

In the system of the invention, a user is not tied to any particular HID. A user is associated with the user session, and the session can be displayed on any HID that the user accesses. An abstraction known as the authentication manager is responsible for ensuring the legitimacy of a user and associating users with their desired session. The HID is typically in sleep, stand-by, or off mode when not in use. When a user wants to use a particular HID, an authentication exchange takes place that may consist of one or more of a smartcard, key, password, and/or biometric mechanism.

When the authentication manager validates a user, it notifies the user's current session manager, which in turn notifies all of the services within the selected session, and the session's display is composed at the user's desktop. From within a session, a user can interact with existing services, initiate new services, or kill of executing services. When the user departs from the HID (e.g. by withdrawing a smartcard) the authentication manager notes this and notifies the session manager, which in turn notifies all of its related services, which stop their display functions, and the HID returns to its dormant state. The effect of the activation and deactivation of an HID is similar to turning off the display monitor on a desktop system. The user desktop is still available and perhaps executing, but no display is generated. One advantage of the present invention is that the user desktop can be accessed on any connected HID.

Figure 2:
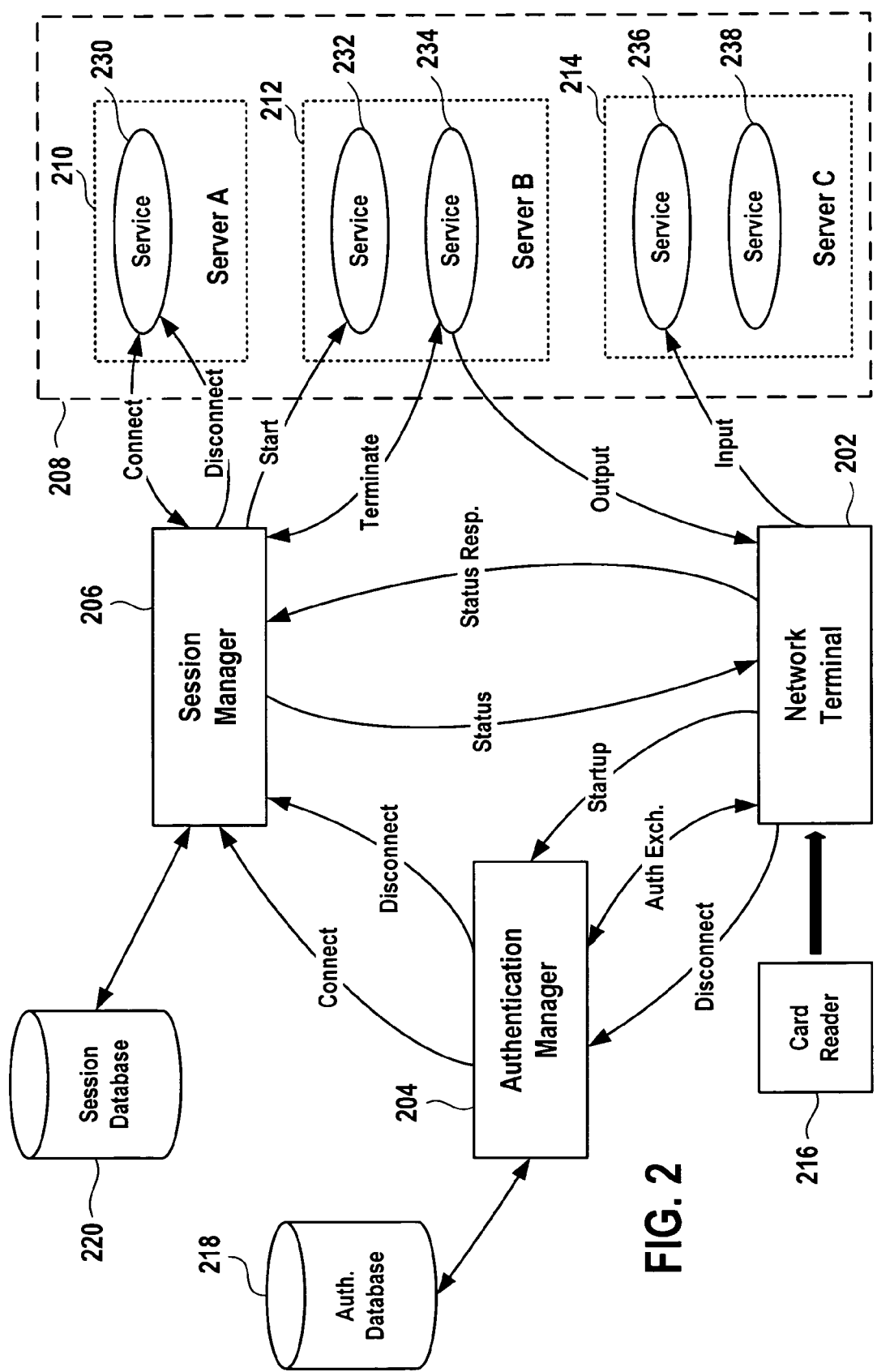
FIG. 2 illustrates an example of session management and authorization in the present invention

FIG. 2 provides an example of session management and authorization in the present invention. This material is described in co-pending U.S. patent application Ser. No. 09/063,339, filed Apr. 20, 1998, entitled "Method and Apparatus for Session Management and User Authentication" and assigned to the present assignee, and incorporated herein by reference. Network terminal 202 is a human interface device (HID), having the task of displaying output of services to a user and obtaining input to services from the user. Network terminal 202 has the ability to respond to a command (e.g., display command) received from, for example, a software program (e.g., services 230-238, authentication 204 and session manager 206) executing on a computational service provider. The input received from a user is forwarded to, for example, a service that is fulfilling a user request.

A service is a program that performs some function for a user. More than one server can execute the services that comprise a session. For example, in session 208, service 230 is executing on server 210, services 232 and 234 are executing on server 212 and services 236 and 238 are executing on server 214.

A user accesses a system (e.g., a server, a session, a service and a network terminal) by initiating a login. During login, the user is validated by authentication manager 204. Various techniques can be used to allow the user to initiate a login. For example, the user can initiate a login by pressing a key on network terminal 202.

In one embodiment of the invention, a user accesses the system by inserting a smart card in a card reader (e.g., card reader 216) attached to network terminal 202. A smart card is a card that is capable of storing information such as in a magnetic strip or memory of the smart card. The smart card can store user information such as a user's identification (i.e., user ID such as a 64-bit number) and a secret code (e.g., a 128-bit random number) that is transmitted to network terminal 202. The secret code is used during authentication.

Network terminal 202 is aware of (or can obtain) its interconnection network address and the address of authentication manager 204. When a user initiates the login, network terminal 202 initiates communication with authentication manager 204 to begin authentication. Authentication manager 204 is a program active (e.g., executing) on a computational service provider connected to network terminal 202 via an interconnection network such as a local area network (LAN), for example. It should be apparent, however, that network terminal 202 can be connected to authentication manager 204 using other interconnection network technologies such as a fiber channel loop or point-to-point cables. Network terminal 202 sends a startup request to authentication manager 204 that includes a user identification (userID).

In one embodiment of the invention, authentication manager 204 responds to the startup request by initiating an authentication to validate the user. Authentication can include any mechanism that verifies the identify of the user to the system. A key or password known only to the user, or biometrics information can be used to authenticate the user.

In an embodiment of the invention, authentication is performed by verifying a personal identification number (PIN) entered by the user at network terminal 202. Authentication manager 204 sends a command (i.e., a challenge command) to initiate entry of the user's PIN at network terminal 202. The user entry is packaged by network terminal 202 and transmitted to authentication manager 204 (i.e., a challenge response).

Authentication manager 204 verifies the challenge response with user information retained in authentication database 218, information supplied by the user and information that is generated during authentication. When the user is authenticated, the user is given access to a session (e.g., session 208). A session is a persistent representation of a related set of one or more services executing on behalf of a user.

If the expected result is received from the user, authentication manager 204 notifies session manager 206 (via a connect message) that the user has logged into the system on network terminal 202. Session information contained in authentication database 218 is used to identify the server, port and session identifier (ID) for session manager 206. Session manager 206 is a program that is active on a computational service provider and is connected to authentication manager 204 and network terminal 202 via an interconnection network, for example. Authentication manager 204 sends a message to session manager 206 using session manager 206's server and port information contained in authentication database 218.

In response to the connect message from authentication manager 204, session manager 206 notifies the services in the user's current session (i.e., the services in session 208) that the user is attached to network terminal 202. That is, session manager 206 sends a connect message to services 230-238 to direct output to network terminal 202. Session manager 206 ensures that services that are considered to be required services of the session are executing. If not, session manager 206 causes them to be initiated. The user can interact with services 230-238 within a session (e.g., session 208). Network terminal 202 is connected to servers 210, 212 and 214 (and services 230-238) via an interconnection network such as a local area network or other interconnection technology. The user can also start new services or terminate existing services.

The user can detach from the system by removing the card from card reader 216. Other mechanisms to express a disconnect can also be used with the invention (e.g., a "sign-off" button on network terminal 202). Services 230-238 can continue to run even after the user removes the card from card reader 216. That is, a user's associated session(s) and the services that comprise a session can continue in existence during the period that a user is unattached (e.g., logged off) from the system. When the user removes the card from card reader 216, network terminal 202 notifies authentication manager 204 (e.g., via a disconnect message) which notifies session manager 206 (e.g., via a disconnect message). Session manager 206 notifies services 230-238 (e.g., via a disconnect message) which terminate their transmission of display commands to network terminal 202. Services 230-238 continue execution, however, during the time that the user is not logged onto a network terminal. The user can log back in using a network terminal such as network terminal 202, connect to session 208 and interact with services 230-238.

Wire Protocol

The present invention is able to partition the computational functionality onto the services in part by converting service output to a standard protocol, or "wire protocol" as it is referred to herein. An example of one embodiment of the wire protocol is attached hereto as Appendix A. The wire protocol provides commands for dealing with video data and audio data. The system also provides mechanisms for managing bandwidth usage.

Video Data

The wire protocol includes rendering commands designed to support the display operations of all of the services which might be performed on behalf of a user. This is accomplished by normalizing all display operations to a number of 2D/rectangle operations (e.g. fill, copy, glyph, stipple). For the transfer of image or video data, pixel array transfer operations are provided, allowing a small set of different formats, including compression formats. In addition, the wire protocol includes support for input device (e.g. keyboard, mouse) handling, audio input/output, and user connect, disconnect, and authentication.

The system architecture of the present invention requires that all APIs which provide rendering for the system's services output the wire protocol of the invention. This is accomplished in one embodiment by having the rendering APIs use a software "virtual frame buffer", and converting all rendering commands from a given high-level API into commands into the wore protocol. For example, the X server could be modified to take commands off of the Spans interface, the GDI interface of Microsoft Windows could be used to gain access to low-level rendering commands, and MPEG video decoder could be split prior to the point at which it colorspace converts and scales the video data. Similarly, the java.awt.graphics class could be subclassed to allow applications and applets to emit the wire protocol (thereby bypassing X or Windows altogether to do its rendering).

In addition to providing support for 2D rendering and device input, the virtual desktop protocol also provides support for multimedia data types. To deal with the wide range of different audio/video formats which exist today, an approach similar to that taken for the 2D display command set has been taken—i.e., do all rendering on a service producer and normalize the output to a low-level format. By converting different media formats into a standardized form understood by all HIDs, the costs of supporting many different formats (whether by a series of specialized hardware upgrades, or software plug-ins) is reduced. Video and imaging data is normalized at a least common denominator—i.e., unscaled, un-color-space-converted, chroma-sub-sampled pixels (e.g., YUV422). This format is common to the large majority of all coding schemes and lends itself to transcoding by a proxy machine (which cuts short the decoding pipeline and emits raw pixel data). In addition, the optional use of a simple form of mild compression (which is both easy to encode and to decode in software) provides an additional factor of six in compression, with very little in the way of image quality degradation. Raw, NTSC video represents 240 Mbps of continuous data when transmitted in RGB format. Chroma-sub-sampled YUV data is 160 Mbps, and the mild compression technique allows a full size and rate NTSC window (or four SIF sized windows, etc) to be transferred at around 30 Mbps. This same video transfer format can be used to send video data from a desktop device as well. The video protocol is described in co-pending patent application Ser. No. 09/063,492, filed Apr. 20, 1998, entitled "Method and Apparatus of Supporting a Video Protocol in a Network Environment", assigned to the assignee of the present invention, and incorporated herein by reference.

Audio Data

Audio data is delivered to and from the desktop by a set of audio commands which are defined as a part of the virtual desktop protocol. Audio reception at a desktop device is supported through what could be thought of as a "universal receiver" approach—any number of streams, of any sample rate data, can be sent to an HID and it will mix and output the streams appropriately. For example, a DAT-quality stereo audio stream could be sent in a 16 bit per sample format at 48 KHz, which would amount to around 1.5 Mbps of data rate. Several of these streams, as well as multiple other audio streams, at other data rates, could be sent to an HID which will effectively retime and mix all of the streams and generate a system audio output stream.

The audio protocol portion of the wire protocol provides a standard protocol for services to use. In an embodiment of the invention, audio processing and hardware requirements associated with a receiver are minimized by specifying a single audio protocol for transmission of audio data between transmitters on a network and the receiver. The protocol specifies a sampling rate, bit resolution and quantization scheme which allow for high sound quality and further minimize the complexity of the receiver. Transmitters are equipped with drivers to provide for conversion of audio data into the designated protocol as needed.

Aspects of the designated protocol are provided to compensate for problems associated with transmitting audio streams over a network. The designated protocol specifies a format for interleaving audio samples within data packets to minimize errors which are the result of consecutive missing audio data samples due to packet loss. The receiver may further compensate for missing audio data samples through interpolation. In accordance with the designated protocol, a sequence size is specified to govern how the audio data is processed. The transmitter controls the sequence size adaptively to maintain audio latency within a limit specified for each audio application. The designated protocol also provides for determination of a mix mode and a number of channels for specifying how audio data with multiple channels is mixed and routed among multiple audio output devices. The audio protocol is described in co-pending patent application Ser. No. 09/063,341, filed Apr. 20, 1998 entitled "Method and Apparatus of Supporting an Audio Protocol in a Network Environment" assigned to the assignee of the present invention, and incorporated herein by reference.

Bandwidth Management

Virtual desktop protocol traffic may be bursty in nature. Long periods of inactivity on the part of a service producer are followed by extremely high bandwidth bursts—e.g., no traffic is generated as a user reads data, and then a full screen update is done once additional data is requested. Peak data-rate bursts in excess of 40 Mbps have been observed, while long-term average data rate is negligible. The fact that bursts have well-defined limits (i.e., ~2 Gbps to change every pixel, each frame time), remain typically below the limits (i.e., usually, some subset of the screen's pixels change, then remain constant for a period of time before the next change), and the bursts are randomly distributed (i.e., users tend to operate independently), all contribute to the ability to take advantage of the gains which come from statistical multiplexing. However, this also requires that some means of handling transient overloads be provided to deal with times when the demand for system resources are exceeds the supply. To this end, a rate control mechanism is employed in the management of the interconnection fabric. This is done to ensure that producers do not generate more data than a link, or a human interface device, can handle. This task is made difficult because there are multiple sources sending on a given interconnect link as well as to a given HID. This means that some form of distributed coordination (or cooperation) must be provided to ensure that the system will work. An effective approach to solving this problem is to use congestion avoidance and rate control techniques to manage the interconnect resources, as well as those resources on the desktop. The use of techniques which are compatible with those in current FTP implementations allow virtual desktop protocol traffic to coexist well with standard internet traffic.

When the cumulative data rate of multiple data sources transmitting data over a medium exceeds the bandwidth of the medium, the medium is incapable of transmitting all of the data at the desired data rates. To maintain the data transmission within the bandwidth limit of the medium, some of the data must be delayed or not sent at all. However, when multiple sources are transmitting varying amounts of data at varying times, the selection of which data is to be delayed or dropped becomes quite complex. Inappropriate selection of data to be delayed or dropped can result in severe reductions in system performance. Thus, a technique is needed to manage the communication of data from multiple sources over a medium of finite bandwidth, where the cumulative bandwidth needs of the multiple sources may exceed the bandwidth of the medium.

In one embodiment of the invention, multiple data sources are coupled to a data receiver through a communication medium. The data sources may be any source of information, and the information may be of any type or of multiple types. For example, the information may be computer program code, text, audio data, video data, graphical data, data representative of conditions or events, digital information, analog information, or any other information in any other form. Examples of data sources include computer equipment, audio devices, video devices, user input devices, information storage devices, network equipment, sensors, identification devices, or any other sources of information.

When information is to be sent from a data source to a data receiver, the data source predicts the amount of bandwidth that will be needed to transfer the information at an acceptable data rate. The data source sends an estimate of its bandwidth needs to the data receiver. In an environment with multiple data sources, the data receiver receives estimates of bandwidth needs from multiple data sources. The data receiver adds the estimates of bandwidth needs of the multiple data sources to obtain the cumulative data rate requested by the multiple data sources. The data receiver compares the cumulative data rate requested to the bandwidth of the communication medium over which the information is to pass. If the cumulative data rate requested is less than the bandwidth of the medium, the data receiver does not limit the data rate of any of the multiple data sources. The data receiver allocates to each data source the full amount of bandwidth requested by that data source.

However, if the cumulative data rate requested exceeds the bandwidth of the communication medium, the data receiver compares the amount of bandwidth requested by each data source. For the data sources requesting relatively low amounts of bandwidth, the data receiver allocates all of the requested bandwidth. For the data sources requesting relatively high amounts of bandwidth, the data receiver allocates only a portion of the bandwidth requested. The data receiver balances the benefits of only slightly reducing the requested bandwidth with the benefits of not reducing the requested bandwidth at all to determine the number of data sources affected by the reduction and the extent of bandwidth reduction for each affected data source.

In one embodiment of the invention, data sources produce estimates of the bandwidth they will likely require by monitoring commands being sent to the data receiver. For example, a data source comprising an X window server monitors commands sent to an X window client program. By monitoring such commands, the X window server can determine the number of bits and the number of pixels to be transmitted and an ideal period of time over which such transmission should occur. By dividing the number of bits by the ideal period of time, the X window server can obtain an ideal data rate expressed in bits per second for the data generated by the commands. Likewise, by dividing the number of pixels by the ideal period of time, the X window server can obtain an ideal data rate expressed in pixels per second for the data generated by the commands. These ideal data rates can be used as initial estimates of bandwidth needs.

As this monitoring and estimation process continues, the historical information concerning the data rates can be used to produce statistical parameters descriptive of the data rates. For example, the average data rate or a data rate equal to the average data rate plus one standard deviation can be accurately approximated and used to determine future bandwidth allocations.

The data sources can perform such monitoring, analysis, and estimation of data rate parameters during periods when they are not transmitting data or, if sufficient computing resources exist at the data sources, during periods when they are transmitting data. For example, if a reduction of allocated bandwidth slows the rate at which a data source can transmit data, the data source may be able to use the time while it waits to transmit the data to perform the monitoring, analysis, and estimation of data rate parameters. The bandwidth management and collision avoidance of the present invention are described in co-pending patent application Ser. No. 09/063,491, filed Apr. 20, 1998, entitled "Method and Apparatus for Management of Communications over Media of Finite Bandwidth", assigned to the assignee of the present invention, and incorporated herein by reference.

Embodiment of Computer Execution Environment (Hardware)

Figure 1:
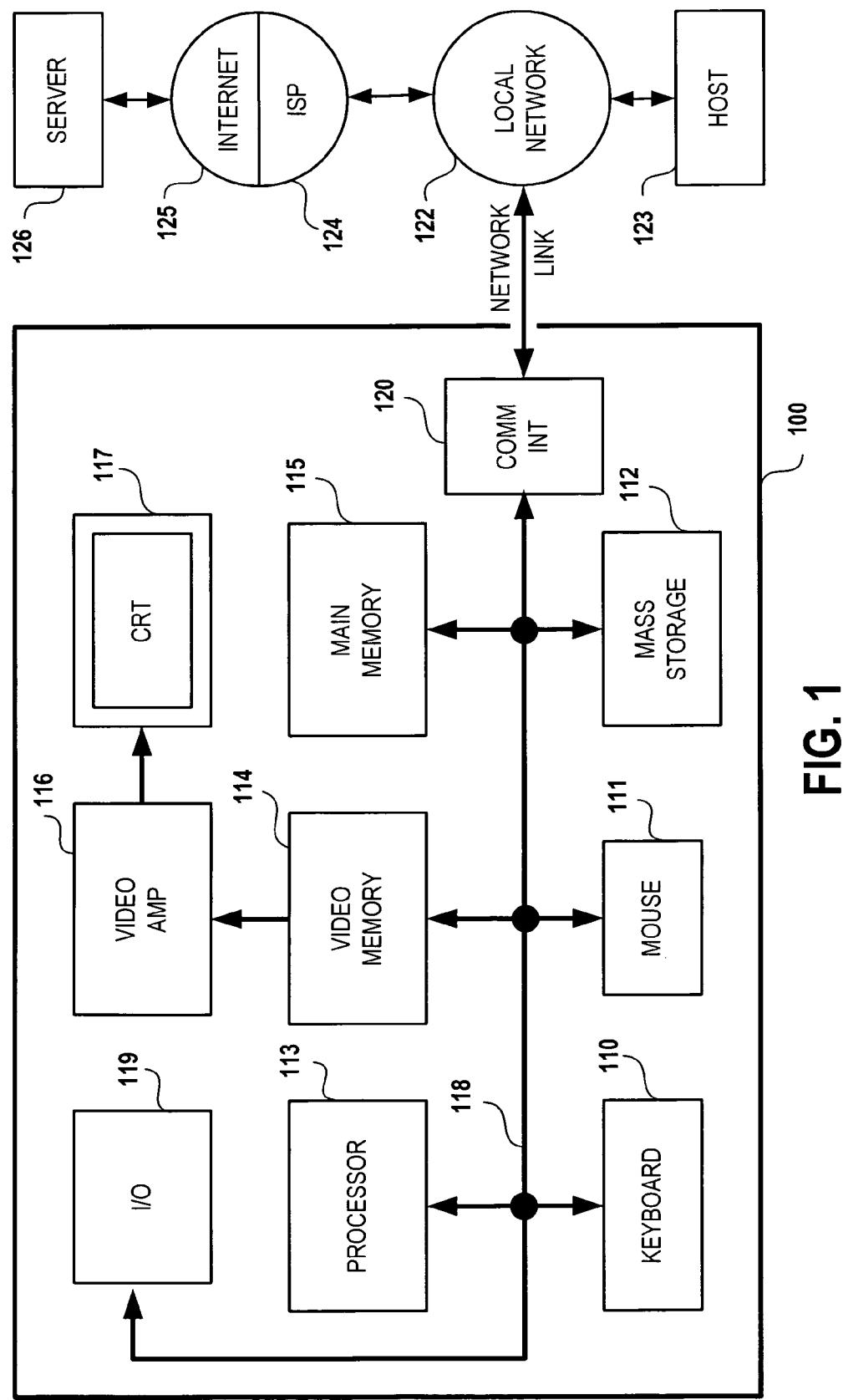
FIG. 1 is a block diagram of an example computer system that can be used with the present invention.

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bi-directional system bus 118 represents such I/O elements as a printer, A/V (audio/video) I/O, etc.

Computer 100 includes a video memory 114, main memory 115 and mass storage 112, all coupled to bi-directional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680×0 processor or a microprocessor manufactured by Intel, such as the 80×86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Alternatively, the video memory could be used to drive a flat panel or liquid crystal display (LCD), or any other suitable data presentation device. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links, modems, or cable modem links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

By reducing the desktop unit's function to a well-defined, fixed, set of behaviors, a range of different implementations become possible. For example the HID could be implemented purely in hardware (e.g. as a board or a chip), it could be implemented as software that controls a small desktop system (e.g. a network computer, personal computer, traditional desktop system), or it could be implemented as an application running on a prior art workstation computer system.

Thus, a method and apparatus for providing a virtual desktop system architecture is described.

Rendering Commands

Wire Protocol Command Formats

All data is sent over the network in network byte order (big-endian) and bit-fields are packed from MSB to LSB.

The basic rendering command format is:

<COMMAND:8> <SEQUENCE:24> <X:16> <Y:16> <WIDTH:16> <HEIGHT:16> <Info>

| COMMAND | Code | <Info> Description |
|---|---|---|
| Set | 0xA1 | WIDTH*HEIGHT of 32-bit values <X,B,G,R> [WIDTH*HEIGHT <= 512 pixels] |
| Fill | 0xA2 | one 32-bit value <X,B,G,R> |
| Glyph | 0xA3 | one 32-bit value <X,B,G,R>, (HEIGHT * ceiling(WIDTH/8)) bytes of bitmap [i.e. each line padded to 8 bits] [WIDTH*HEIGHT <= 2048 pixels]; the entire command is padded to the next 32-bit boundary |
| Copy | 0xA4 | <FROM_X:16> <FROM_Y:16> |
| Bilevel | 0xA5 | two 32-bit values c0, and c1, <X,B,G,R>, followed by (HEIGHT * ceiling(WIDTH/8)) bytes of bitmap [i.e. each line padded to 8 bits] (WIDTH*HEIGHT <= 2048 pixels]; the entire command is padded to the next 32-bit boundary |
| Set24 | 0xA6 | WIDTH*HEIGHT of packed 24-bit values <B,G,R> [WIDTH*HEIGHT <= 512 pixels] padded to the next 32-bit boundary |
| Set YUV Image | 0xA7 | <SOURCE_W:16> <SOURCE_H:16> <RFU:8> <LUMA_ENCODING:2> <CHROMA_SUB_X:3> <CHROMA_SUB_Y:3> followed by (SOURCE_W * SOURCE_H) pixels Y [luma] with each line padded to a byte boundary, and (ceiling (SOURCE_W / x_subsample) * ceiling(SOURCE_H / y_subsample)) bytes each of 8-bit signed U and V [chroma] in CCIR-601 value encodings; the entire command is padded to the next 32-bit boundary; [SOURCE_W * SOURCE_H <= 1024 pixels]; [SOURCE_W <= WIDTH]; [SOURCE_H <= HEIGHT] |
| Set Cursor | 0xA9 | two 32-bit values c0, and c1, <X,B,G,R>, followed by two sets of (HEIGHT * ceiling(WIDTH/8)) bytes of bitmap [i.e. each line padded to 8 bits] [WIDTH & HEIGHT <= 64 pixels each]. The first bitmap is the pixel values, the second is the per-pixel mask. The entire command is padded to the next 32-bit boundary. |
| Set Pointer | 0xAA | <INDEX:8> <DIM:2> <PAD:6> { <Z:16> { <P:16> <R:16> <H:16> <PAD:16> } } | <PAD:16> note that all values are signed, 2's compliment. Angular values range from −180 to +180 − (1 lsb) = +179.9945 (degrees over full range. WIDTH, HEIGHT are ignored. |
| Set Key Locks | 0xAB | X, Y, WIDTH, HEIGHT ignored. <INDEX:8> <LOCKS:8> <PAD:16> |
| Damage Repair | 0xAC | <EPOCH:32> <PAD:8> <SEQ:24> |

-continued

| COMMAND | Code | <Info> Description |
|---|---|---|
| Play Audio | 0xB1 | X, Y, WIDTH, HEIGHT are encoded as follows:<br>X:4      audio sequence number<br>X:12     interleave offset<br>Y        total sequence length − 1<br>WIDTH:4   mixer mode<br>            specifies the # of channels<br>            to include in the standard mix.<br>            Channel numbers above this<br>            number are sent raw and not<br>            combined with any other channel<br>            if the terminal has insufficient<br>            channels to cover the request.<br>WIDTH:12   packet len in samples<br>            max 2000 bytes<br>HEIGHT:4   number of channels − 1<br>HEIGHT:12   interleave size − 1<br>The header is followed by the specified number of samples x number of channels x 16 bits.<br>The entire command is padded to 32 bits. |

The sequence number is incremented for each command.

Sequence numbers may not be all zero except for a epoch changing flush command, described below. Rectangles may not wrap. I.e. x+width<0x10000 and y+height<0x10000.

One additional informational command is defined with a different format:

<COMMAND:8> <SEQUENCE:24> <EPOCH:32> <FILL:16*8>

| COMMAND | Code |
|---|---|
| Flush | 0xAF |

The sequence number of a flush command is the same as the sequence number of the previous command, with the exception of epoch changes (see description below). That is, sequence numbers only increment when pixels change or the epoch changes.

Command Descriptions

| Command | Description |
|---|---|
| Set | Set the rectangle defined by <x, y> <width, height> to the pixel values that follow. There is one pixel value for each pixel in the region. The layout is by rows; i.e. there are "width" pixel values for pixels at <x, y> through <x+width−1, y> followed by pixels at <x, y+1> through <x+width−1, y+1>, etc. <0,0> describes the upper left corner. |
| Fill | Set all pixels in the rectangle defined by <x, y> <width, height> to the single 32-bit value. |
| Glyph | The 32-bit value is placed in the pixel location corresponding with each one bit in the bitmap, positions associated with zero bits are unchanged. The bitmap is laid out by rows (y, y+1, . . . ), using MSB to LSB in each byte. |
| Copy | Copy the rectangle defined by <from_x, from_y> <width, height> to the rectangle defined by <x, y> <width, height>. The client must ensure overlapping regions are copied correctly (e.g. see Solaris bstring(3)). |
| Bilevel | The two 32-bit values c0 and c1, are placed in the pixel location corresponding with each zero and one bit, respectively, in the bitmap. The bitmap is laid out by rows (y, y+1, . . . ), using MSB to LSB in each byte. |
| Set24 | Set the rectangle defined by <x, y> <width, height> to the pixel values that follow. The pixel values are packed such that there are four pixels defined by three 32-bit values thusly: <bgrb, grbg, rbgr>. If width is not a multiple of four, the end is packed the same as above with the remaining values and padded to the nearest 32-bit value. There is one pixel value for each pixel in the region. The layout is by rows; i.e. there are "width" pixel values for pixels at <x, y> through <x+width−1, y> in ((3 * width + 3) / 4) 32-bit words followed by pixels at <x, y+1> through <x+width−1, y+1>, etc. <0,0> describes the upper left corner. |
| Set YUV Image | Set the rectangle defined by <x, y> <width, height> to the pixel values provided as follows. The image in CCIR/ITU.BT-601 Y'CbCr (or YUV) format of source_w by source_h pixels is decoded to RGB. The chroma elements may be subsampled in the horizontal and/or vertical dimensions as specified and must be up-sampled prior to the transformation. The values of CHROMA_SUB_X and CHROMA_SUB_Y (x_subsample and y_subsample, respectively) are encoded as follows:<br>0     No chroma values; monochrome image.<br>1     Subsample by 1 (i.e. no subsample)<br>2     Subsample by 2<br>3     Subsample by 4<br>4-7   Undefined/reserved<br>LUMA_ENCODING values are:<br>0     Y (luma) is specified by 8-bit unsigned data<br>1     Y (luma) consists of 4-bit quantized DPCM values (see below)<br>2,3   Undefined/reserved<br>RFU is reserved for future use and must be 0. After decoding, the RGB image is scaled up as necessary to width by height pixels. The resulting image is put on the display at location <x, y>.<br>Note: if both CHROMA_SUB_X and CHROMA_SUB_Y are zero, the image is monochrome (luma only) and no U or V data is present. It is invalid to have one set to zero and the other non-zero. The component order is Y (or CCIR-601 Y'), U (CCIR-601 Cb), and then V (CCUR-601 Cr). |
| Set Cursor | This command sets the appearance of the local display cursor (moved and reported by Pointer [0]). The cursor is a maximum of a 64 × 64 block, but may be any size less than that. If the mask value for a particular pixel is '1', the corresponding cursor pixel is displayed; if the mask is '0', the cursor is transparent at that location. When the |

-continued

| Command | Description |
|---|---|
| | mask is '1', the pixel value is 'c0' when the value is '0', and 'ci' when the value is '1'. If the mask is zero, the pixel value should also be zero. A mask of zero and a pixel value of one is reserved for future expansion. WIDTH and HEIGHT may be zero, indicating not to draw a cursor (equivalent to a mask of all zeros). Pointer tracking continues to work normally. X and Y denote the 'hot spot' for the cursor; e.g., on what pixel of the cursor image events are to be reported. This is primarily used for stopping the cursor on the edges of the display. X (0, WIDTH), Y (0, HEIGHT). |
| Set Pointer | Sets the location of a pointer. Pointer [0] is usually settable (mouse or touchscreen) and is the 2-D screen cursor. This command is provided for applications that insist on setting their pointer, or for applications that need relative pointers (e.g. reset the cursor to its previous position) . As such, there are a few restrictions: setting the pointer may not work (e.g. a joystick) at all the pointer value may be clipped arbitrarily to match the pointer device or the screen the user can continue to move the pointer once it is set, but that is reported using a 'Pointer State' status message. the behavior of resetting the pointer for pseudo-relative mode could cause different behaviors with different devices; e.g. a touch screen, is only settable when the user is not 'dragging'. Pointers are allowed to have up to six dimensions. The number of dimensions and the size of the command are set using the DIM bits. All pointer values are signed, 2's compliment. |
| Set Key Locks | This command sets the lock values for an <INDEX>'ed keyboard. Locks generally correspond to lights on the keyboard that are software controllable. If a lock condition is to be indicated, then the bit should be set in the mask, otherwise, the bit should be cleared. Since some keyboards may implement locks locally (e.g. mechanically), setting a lock may not have an affect. Keys from the keyboard should always be interpreted from the state reported by the keyboard. On the other hand, the host is required to issue a Set Key Lock command on reception of a locked keycode, if that is what the interface dictates, because both normal keyboards and the terminal do not attempt to handle locking locally. This is because the terminal does not understand the keyboard or desired user interface semantics. The key lock bitmap is from the USB class definition for Boot Keyboards: 0x01 Num Lock 0x02 Caps Lock 0x04 Scroll Lock 0x08 Compose 0x10 Kana All other bits are reserved -- ignored on read, zero on set. |
| Damage Repair | This informs the client that all damage messages for sequence number SEQ in epoch EPOCH and earlier have been processed and repair data sent. (see the Damage back-channel command). PAD must be 0. X, Y, WIDTH, and HEIGHT must be 0; |
| Play Audio | This plays 48 kHz audio samples, and may be imbeded in a graphics command stream. An undefined number of streams are received by the terminal on a first-come-first-served basis. Streams are allocated on an as-needed basis and are broken down when buffer starvation occurs (there is no data to play when its time comes -- partially received buffers are error concealed and played). The terminal corrects for timebase drift. Data is sent in an interleaved manner to aid in network error concealment. A sample sequence is split into an interleave size and at most 1+(sequence size)/(interleave size) samples are emmitted per packet. The samples are selected as follows: sample sequence [sample_size]; int seq_number = 0; while (1) { get_samples (sequence, sample_size); for (i =0; i < interleave_size; i++) { interleave_offset = random_select (0 . . . interleave_size); packet=new_packet (seq_number, sample_size, num_chan, num_chan, interleave_size, interleave_offset); for (j = interleave_offset; j < sample_size; j += interleave_size) emit (packet, sequence [j]); send_packet (packet); } seq_number = (seq_number+1)%16; } note that the order that the packets are sent can (and probably should) be random. For example, for an interleave of 3 and and sequence size of 8, the following three packets could be sent: (samples) (0 1 2 3 4 5 6 7) pkt 1, off 1: 1 4 7 pkt 2, off 0: 0 3 6 pkt 3, off 2: 2 5 The sequences are numbered so that the terminal knows when to error conceal and emit a sample sequence. Samples are 48 kHz, 16 bit linear, and may contain up to 16 channels. For example, a 5-channel sample would take 10 consecutive bytes. There is no definition for the number of audio channels supported by the terminal, nor any way to find out, but up to 16 channels can be sent at once. Since there may be a different number of channels sent than the terminal supports, the concept of a standard mix is introduced for the first 8 channels. This may be disabled by setting the "MIX" field that guarantees certain indexed channels are not to be mixed together. The last 8 channels are mixed in the same scheme as the first 8 so that sound may be heard. If there are sufficient channels, then results are terminal setup dependent. The standard assigned channels are as follows: channel-> # chan 0 1 2 3 4 5 6 7 1 mono 2 l r 3 l r sw |

-continued

| Command | Description |
|---------|-------------|
|  | 4  1  r  rl  rr |
|  | 5  1  r  rl  rr  sw |
|  | 6  1  r  rl  rr  sw  cf |
|  | 7  1  r  rl  rr  sw  cf  top |
|  | 8  1  r  rl  rr  sw  cf  cl  cr |
|  | (1=left, r=right, r[1r]=rear{left, right} sw=subwoofer, cf=center fill, c[1r]=center{left, right{, top=center-center For example, if there are two speakers and one channel is sent with the standard mix enabled, the one channel will be sent to both the left and right speakers. Conversely, if the same terminal were sent 6 channels, channels 0,2,4,5 will be mixed and sent to the left speaker and channels 1,3,4,5 will be mixed and sent to the right speaker. The terminal speakers are set up in the same manner. The full mixing matrix is available in the full specification. |
| Flush | There may be no commands in the display stream for a period of time following this command; therefore, this is a good point for clients to flush all unfinished rendering to the screen. The epoch field provides 32 additional high order bits for the sequence numbers. FILL consists of 16 bytes set to all 0xFF. This command provides an opportunity to re-synchronize data stream after a dropout. The sequence number of a flush command is normally the same as the last non-flush command. However, when a epoch is exhausted, (i.e. the sequence number of the last command is 0xFFFFFF), a flush command with a sequence number of zero and a new epoch number (incremented by 1) is sent. |

Back-Channel Commands

Wire Protocol Status Message Formats

The basic status command format is:

| <COMMAND:8> <TIME:24 > <Info> | | |
|---|---|---|
| COMMAND | Code | <Info> Description |
| Keyboard State | 0xc1 | <INDEX:8> <COUNTRY CODE:8> <LOCKS:8> <MODIFIERS:8> <KEYCODE:8>[8] |
| Pointer State | 0xc2 | <INDEX:8> <DIM:2> <BUTTONS:6> <X:16> {<Y:16> {<Z:16> {<P:16> <R:16> <H:16>}}} note that all values are signed, 2's compliment. Angular values range from −180 to +180 − (1 lsb) = +179.9945 (degrees over full range. |
|  |  | DIM  Dimensions |
|  |  | 0  X |
|  |  | 1  x,Y |
|  |  | 2  X, Y, Z |
|  |  | 3  X, Y, Z, P, R, H (yaw) |
| Active Region | 0xc3 | <X:16> <Y:16> <WIDTH:16> <HEIGHT:16> |
| Damage | 0xc4 | <EPOCH:32> <PAD0:8> <SEQ_L:24> <PAD1:8> <SEQ_H:24> |

Note: TIME is in microseconds; it wraps after 2**24 (approx 16 seconds).

Status Message Descriptions

| Command | Description |
|---------|-------------|
| Keyboard State | Reports the state of the <INDEX>'ed keyboard. The country code is from the USB Device Class Definition for BIDs, section 6.2. The locks are from the USB class definition for boot keyboards: |
|  | 0x01  Num Lock |
|  | 0x02  Caps Lock |
|  | 0x04  Scroll Lock |
|  | 0x08  Compose |
|  | 0x10  Kana |
|  | The 'Set Key Locks' command may be used to reset these locks, and should be used if a lock key is detected at the host since keyboards generally don't locally handle lock status, and the terminal certainly doesn't either. Bits other than those specified are reserved and should be ignored. On set, they should be set to zero. The modifier bits are from the USB class definition for boot keyboards as well: |
|  | 0x01  Left Control |
|  | 0x02  Left Shift |
|  | 0x04  Left Alt |
|  | 0x08  Left GUI |
|  | 0x10  Right Control |
|  | 0x20  Right Shift |
|  | 0x40  Right Alt |
|  | 0x80  Right GUI |
|  | There is always space for six key scancodes. All keys (that are not modifiers) that are pressed are reported, up to six keys. This provides simple roll-over and chording capabilities. The scan codes are from the USB class definition for boot keyboards. Of special note is code 0x00 denoting no event in the slot, and 0x01 in all slots indicates that more than 8 keys have been pressed. Modifiers are still reported in this state. Once less than 9 keys are pressed, normal reports resume. 'Report order is arbitrary and does not reflect order of events.' |
| Pointer State | Reports the state of the <INDEX>'ed pointer. DIM indicates the number of dimensions reported: 1, 2, 3, or 6. The buttons are from the USB class definition for boot keyboards, bit zero is the 'primary' button (on the left), and the numbers increase from left-to-right. The reported values are all absolute and are signed, two's compliment. |
| Active Region | Indicates the area of the logical framebuffer that is retained on the newt. Specifically, this is the area that the "from" region of Copy rendering commands can be specified successfully. This region may change over time on a given client, for example, due to a pan-and-scan style of interface in a handheld device. Also, different client devices may report different active regions. |
| Damage | Indicates that downstream (render) commands from sequence number SEQ_L through and including sequence number SEQ_H in epoch EPOCH were not received by the client from the server. PAD0 and PAD1 must be 0. The client will continue to report damage until a Damage Repair message for the affected sequence number is received. If SEQ_L is 0, then the full current screen image must be sent. |

-continued

| Command | Description |
|---|---|
| | Once a damage message is sent for a given sequence number, no new subsequent damage may be sent for earlier sequence numbers. However, it is permissible to collapse two or more ranges into one in order to save space in later status packets. |

DPCM YUV Description:

Further compression of YUV data is possible with the LUMA_ENCODING of 1.

Luma data is encoded as follows:
    for each line
    last_value = 0x80
    foreach luma-value l in line
        diff = l − last_value
        q_value = quant[diff]
        last_value = clamp[last_value + dquant[q_value]]
        emit q_value
    end
    end Luma data is decoded as follows:
    for each line
    last_value = 0x80
    foreach quantization-value q_value in line
        last_value = clamp[last_value + dquant[q_value]]
        emit last_value
    end
    end Clamp is a clamping table; clamp[i] is:

| | |
|---|---|
| 0 | if i < 0; |
| 255 | if i > 255; |
| i | otherwise. |

The quantizer used is:

| Difference | code | rquant |
|---|---|---|
| −255 to −91 | 0 | −100 |
| −90 to −71 | 1 | −80 |
| −70 to −51 | 2 | −60 |
| −50 to −31 | 3 | −40 |
| −30 to −16 | 4 | −20 |
| −15 to −8 | 5 | −10 |
| −7 to −3 | 6 | −4 |
| −2 to 0 | 7 | −1 |
| 1 to 2 | 8 | 1 |
| 3 to 7 | 9 | 4 |
| 8 to 15 | 10 | 10 |
| 16 to 30 | 11 | 20 |
| 31 to 50 | 12 | 40 |
| 51 to 70 | 13 | 60 |
| 71 to 90 | 14 | 80 |
| 91 to 255 | 15 | 100 |

The invention claimed is:

1. A computing system architecture comprising:
a data source for providing data through an interconnect fabric;
a stateless human interface device coupled to said interconnect fabric for receiving and rendering data, wherein said data source is configured to maintain an active session associated with a user when said user is connected and disconnected from said stateless human interface device, said active session including a persistent representation of one or more executing services for the active session, such that said active session is maintained, and the executing services of said active session are configured to continue execution when said user is disconnected; and
an identifier associated with said user configured to connect said user with said stateless human interface device, said stateless human interface device configured to display said active session when said user is connected, said active session resuming said persistent representation of the executing services from a previous but still active session from which said user previously disconnected, said stateless human interface device configured to not display said active session when said user is disconnected,
wherein said identifier configured to provide said user access to said active session from any of a plurality of stateless human interface devices connected to said data source through said interconnect fabric.

2. The architecture of claim 1 wherein said identifier comprises a physical identifier.

3. The architecture of claim 1 wherein said identifier comprises a biometric identifier.

4. The architecture of claim 1 wherein said user accesses a computing session of said user when said user access said stateless human interface device.

5. The architecture of claim 1 wherein said data source comprises a plurality of data services.

6. The architecture of claim 5 said output of said plurality of data services is converted to a common protocol for transmitting across said interconnect fabric to said stateless human interface device.

7. A computing system comprising:
a centralized processing source providing computation and data generation for a plurality of user sessions;
a plurality of stateless human interface devices coupled through an interconnect fabric to said centralized processing source, wherein each of said stateless human interface devices receive data from said centralized processing source and display output to a user initiating one of said plurality of user sessions, and wherein each of said stateless human interface devices provide user input to said centralized processing source across said interconnect fabric, and wherein said centralized processing source is configured to maintain an active session associated with said user when said user is connected and disconnected from one of said stateless human interface devices, wherein said active session comprises of a persistent representation of one or more executing services for the active session, such that the active session is maintained and the executing services of said active session are configured to continue execution when said user is disconnected from one of said stateless human interface devices; and
an identifier associated with said user capable of connecting said user to any of said stateless human interface devices such that a session associated with said user is displayed on a stateless human interface device connected to said user, said session resuming said persistent representation of the executing services from a previous but still active session from which said user previously disconnected, said stateless human interface device configured to not display said session when said user is disconnected.

8. The system of claim 7 wherein a state of a user session is maintained at said centralized computing resource.

9. The system of claim 8 wherein said user input comprises keyboard strokes.

10. The system of claim 8 wherein said user input comprises cursor movements.

11. The system of claim 8 wherein said user input comprises audio.

12. The system of claim 8 wherein said user input comprises video.

13. The system of claim 8 wherein said identifier is a physical identifier.

* * * * *